(12) United States Patent
Hoffman

(10) Patent No.: US 7,110,990 B2
(45) Date of Patent: Sep. 19, 2006

(54) DECISION ANALYSIS SYSTEM AND METHOD

(76) Inventor: Roger P. Hoffman, 2780 Queen Ann Ct., Green Bay, WI (US) 54304

( * ) Notice: Subject to any disclaimer, the term of this patent is extended or adjusted under 35 U.S.C. 154(b) by 1325 days.

(21) Appl. No.: 09/837,642

(22) Filed: Apr. 18, 2001

(65) Prior Publication Data

US 2001/0047324 A1 Nov. 29, 2001

(51) Int. Cl.
*G06N 5/00* (2006.01)
(52) U.S. Cl. .............. 706/47; 700/106; 714/4; 705/26
(58) Field of Classification Search ........... 700/106; 705/26; 706/47; 714/4
See application file for complete search history.

(56) References Cited

U.S. PATENT DOCUMENTS

| 5,758,328 | A  | * | 5/1998 | Giovannoli | 705/26 |
| 5,842,178 | A  | * | 11/1998 | Giovannoli | 705/26 |
| 6,671,818 | B1 | * | 12/2003 | Mikurak | 714/4 |
| 6,687,559 | B1 | * | 2/2004 | Radjy et al. | 700/106 |

* cited by examiner

*Primary Examiner*—Wilbert L. Starks, Jr.
(74) *Attorney, Agent, or Firm*—Philip Weiss; Weiss & Weiss

(57) ABSTRACT

The invention relates to the field of computer analysis of text documents. More specifically it relates to the field of artificially intelligent systems capable of analyzing responses to Request for Quotation (RFQ).

9 Claims, No Drawings

DECISION ANALYSIS SYSTEM AND METHOD

FIELD OF THE INVENTION

The invention relates to the field of computer analysis of text documents. More specifically it relates to the field of artificial intelligent systems capable of analyzing responses to Request for Quotation (RFQ).

BACKGROUND OF THE INVENTION

When a company submits a Request for Quotation to a number of potential suppliers, it is important not to spend too much time reviewing responses that do not satisfy requirements of the company submitting the RFQ. In most cases when responses to RFQ's come into a company through the mail persons at that company have to review and sort the responses and usually write up a summary of whether the response is acceptable to the company. In addition it is desirable to be able to quickly evaluate potential responses to an RFQ in an efficient and accurate manner.

With the invention of the Internet more and more companies are sending out RFQ's over the Internet. Companies are then responding over the Internet to the company with a quotation. In order to process these quotations efficiently the present invention provides an artificial intelligent system capable of analyzing quotes and extracting information relating to the RFQ.

SUMMARY OF THE INVENTION

The present invention relates to a computer analysis of text documents. It is an object of the present invention to analyze responses to RFQ's to determine whether they conform to a rule based system. It is an object of the present invention to classify a quote based on a set of rules to determine whether the quote satisfies the rules of the company. It is an object of the present invention to provide a method and apparatus which converts quotes into a series of correctly ordered blocks comprised of computer understandable character strings, which strings contain the context of the quote. It is an object of the present invention to locate and extract words and word groups containing information believed to be relevant to the quote.

It is an object of the present invention to compare information extracted from a quote to guidelines provided by a company. The system based on the guidelines rates each quote received. If the quote does not conform to the standard guidelines of the company, it is not given a rating.

DETAILED DESCRIPTION OF THE INVENTION

A digital computer system using the method and apparatus described herein, operates on data derived from a printed quote. The computer extracts words and word groups considered relevant to the categorization process. In a preferred embodiment, each quote received by the system is part of a standardized form. In a preferred embodiment, a quote should include such items as price, delivery date, quantity, origination, name of company, whether the company has done business prior, specification of the goods, etc.

The system of the present invention in a preferred embodiment then divides these categories into musts and wants. The quote must satisfy every must that is included by the company. For instance if the company requests that the price must be no higher than a certain amount and this is a must requirement of the company, then this quote is automatically thrown out if it does not meet this requirement. In a preferred embodiment, once a quote satisfies all of the must requirements then it is graded on a number, for example from 1–100, based on the other criteria of the quote.

In one embodiment pricing could be rated a 10, shipping an 8, origin a 5, and so on so that each quote is given a number based on the importance of each criteria of each company, where 10 is the most important characteristic and 1 is the least important characteristic.

For example, if a customer requests a quote on several tons of light weight coated paper, the customer can enter the following information in a list generated by a standard form on the computer:

There are five vendors in this example, numbered one through five.

| Characteristic | Weighting Factor |
| --- | --- |
| Price | 10 |
| Payment Terms | 9 |
| Print Index | 8 |
| Brightness | 7 |
| Smoothness | 6 |
| Opacity | 5 |
| Proximity (distance from location) | 4 |
| Serviceability | 3 |
| New or existing supplier | 2 |
| Freight (if applicable) | 1 |

In one embodiment, each vendor is rated individually, such as if the vendor's price is between $800–$1000 per ton then the Vendor gets a 10 for price and this is multiplied by the weighting factor.

In a further embodiment the vendors are be numbered one through five for each category and if a vendor has the best price they get a ten, second best price gets an eight and so on for each category.

The system of the present invention can be standardized for the particular needs of each company.

In one example the system can search for a word in a quote, such as price. The guidelines for the price can be that the price be no higher than $1,000. The system would compare the price found in the quote to the guideline for that price to see if it meets the specific criteria. The system of the present invention can also order each of the responses to the RFQs based on a number of factors. For example, the responses can be put in order based on the shipping distance to the destination, price, etc. The RFQ can also describe certain characteristics of the goods to purchase. Depending on how close the specifications for the goods in the response are to the specification in the RFQ, the system can provide a further rating.

The invention claimed is:

1. A method for analyzing responses to requests for quotations (RFQ's) comprising;
   analyzing responses to RFQ's to determine whether they conform to a rule based system;
   classifying a quote based on a set of rules to determine whether the quote satisfies said rules of said company;
   converting said quotes into a series of ordered blocks comprised of computer understandable character strings, which strings contain context of said quote;
   locating and extracting words and word groups containing information believed to be relevant to said quote.

2. The method of claim 1 further comprising;
comparing information extracted from said quote to guidelines provided by a company.

3. The method of claim 2 further comprising rating each quote based on said guidelines.

4. The method of claim 3 wherein if said quote does not conform to said guidelines, no rating is given.

5. The method of claim 4 wherein said companies that are disqualified for not meeting said guidelines are listed for a user with a listing of reasons why said company is not qualified.

6. The method of claim 3 wherein each item in said quote is weighted.

7. The method of claim 2 further comprising;
dividing said guidelines into musts and wants.

8. A system for evaluating quotes comprising;
a digital computer system;
data derived from a printed quote;
said computer extracting words and word groups from said quote;
set of printed rules;
a rating for each quote based on said words and word groups from said quote compared to said set of printed rules.

9. The system of claim 8 wherein said quote comprises price, delivery date, quantity, origination, name of company, whether the company has done business prior, or specification of the goods.

* * * * *